United States Patent [19]

Olson

[11] Patent Number: 4,679,596

[45] Date of Patent: Jul. 14, 1987

[54] PRESSURE RELIEF VALVE

[75] Inventor: Daniel H. Olson, Louisville, Ohio

[73] Assignee: Snyder Laboratories, Inc., Dover, Ohio

[21] Appl. No.: 825,167

[22] Filed: Feb. 3, 1986

[51] Int. Cl.$^4$ ............................................. F16K 15/14
[52] U.S. Cl. ................................................... 137/853
[58] Field of Search ............................ 137/512.15, 853

[56] References Cited

U.S. PATENT DOCUMENTS

| | | | |
|---|---|---|---|
| 2,473,912 | 6/1949 | Schwinn | 137/853 |
| 2,621,889 | 12/1952 | Annin | 137/853 |
| 2,679,336 | 5/1954 | Frick | 222/209 |
| 2,930,399 | 3/1960 | Babson | 137/525.3 |
| 3,138,173 | 6/1964 | Hartman | 137/493.8 |
| 3,384,113 | 5/1968 | Pennisi | 137/853 |
| 3,459,217 | 8/1969 | Callahan | 137/516.15 |
| 4,194,435 | 3/1980 | Gaun et al. | 91/234 |
| 4,346,704 | 8/1982 | Kulle | 128/214 |

FOREIGN PATENT DOCUMENTS 961732  1/1975  Canada .............................. 137/853

Primary Examiner—Robert G. Nilson
Attorney, Agent, or Firm—Paul David Schoenle

[57] ABSTRACT

A pressure relief valve includes a body coupled to a tube and a resilient sleeve cooperates with the tube and body to vent the interior of the tube when fluid pressure therein reaches a predetermined level.

7 Claims, 4 Drawing Figures

PRESSURE RELIEF VALVE

A pressure relief valve is coupled to a tube to vent the interior of the tube when the fluid pressure therein reaches or exceeds a predetermined pressure level.

In U.S. Pat. No. 2,621,889 a sleeve type valve includes a resilient sleeve cooperating with a body to control fluid communication from one tubular opening to another tubular opening. The body forms a seat and the resilient sleeve is contracted into engagement with the seat in view of the inherent resilient forces biasing the resilient sleeve to return to its free shape which is diametrically smaller than the body. When the fluid pressure within the one tubular opening reaches a predetermined level, the resilient sleeve is biased to further expand in spaced relation to the body seat so that fluid pressure is free to communicate outwardly from the one tubular opening. When the resilient sleeve is spaced from the seat it is in an unstable condition totally dependent upon fluid pressure and flow characteristics to maintain a uniform opening venting the one tubular opening. In addition, to accommodate the expansion and contraction of the resilient sleeve at the body seat, the resilient sleeve includes a variable thickness with a thick portion trapped between tubular elements and a thin portion engageable with the body seat.

The present invention provides a pressure relief valve with a resilient sleeve cooperating with a body coupled to a tube. The resilient sleeve comprises a thin wall elastic tubing of latex or silicone type material with a uniform thickness so that this part can be readily constructed from existing tubing in the absence of a complicated structure therefore. Moreover, the body is made from a plastic material such as polypropylene which is readily formed via injection molding to insure uniformity in structure for each body part. The body is provided with several interfaces cooperating with the resilient sleeve to more accurately control the venting of a tube in response to fluid pressure variations in the tube.

It is an object of the present invention to provide a pressure relief valve of simple construction which manifests different modes of operation depending on the pressure level contained in the tube to which the pressure relief valve is attached.

A tube 10 is coupled to a system 12 which generates fluid pressure for any suitable operation. The tube 10 is in communication with the fluid pressure generated by the system 12 and a pressure relief valve 14 is coupled to the end 16 of the tube 10 to control fluid pressure build up in the tube 10 and the system 12.

Figure 1:
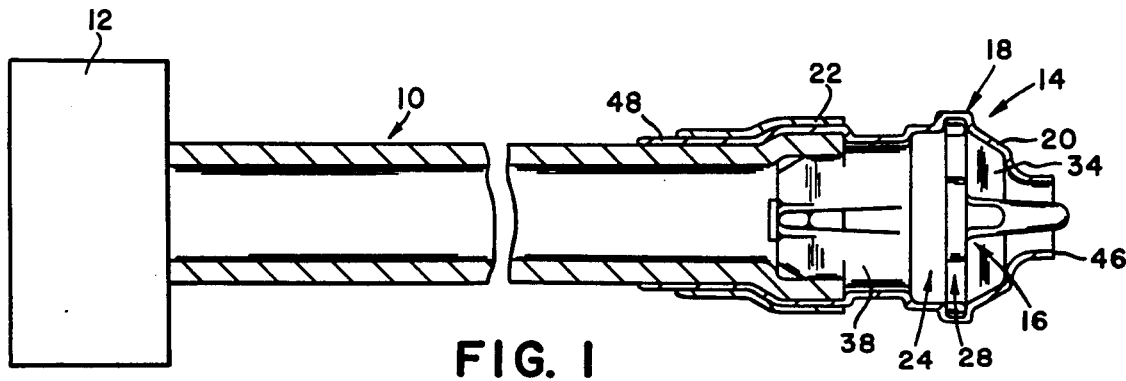
FIG. 1 is a side view of a tube and pressure relief valve according to the present invention.
Figure 2:
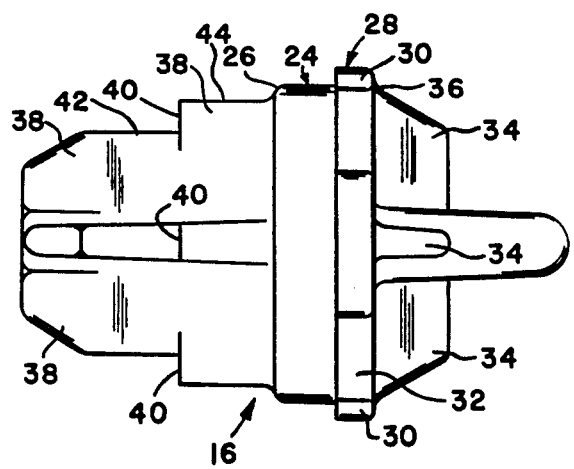
FIG. 2 is a side view of the body.

The pressure relief valve 14 includes a body 16 made from polypropylene or other plastic material suitable for injection molding, and a resilient sleeve assembly 18 comprising a first resilient sleeve 20 and a second resilient sleeve 22. Turning to FIG. 2, the body forms a first surface 24 of annular shape to define a seat 26 at the left side of surface 24. A second surface 28 is formed from a plurality of flanges 30 extending radially outwardly past the first surface 24. Each flange cooperates with the adjacent flange to define a cutout 32 of rectangular shape adjacent the first surface 24. In addition each flange includes a rib 34 extending axially outwardly and radially inwardly.

The ribs define an outer edge which intersects their respective flange 30 at a location 36 which is substantially at the same radial position for the first surface 24. During actuation with fluid pressure communicated into the tube 10, the ribs 34 cooperate with the resilient sleeve assembly 18 to retain the latter in its position on the body 16. Moreover, the resilient sleeve assembly stretch is normalized so that movement of the resilient sleeve assembly relative to the first surface 24 is uniform. The first surface 24 is formed by an annular portion from which a plurality of ribs 38 extend. Each rib 38 forms a shoulder 40 between an inner leading edge 42 and an outer edge 44 adjacent the first surface 24. The shoulder 40 limits the telescopic disposition of the body 16 inside the tube 10.

Figure 4:
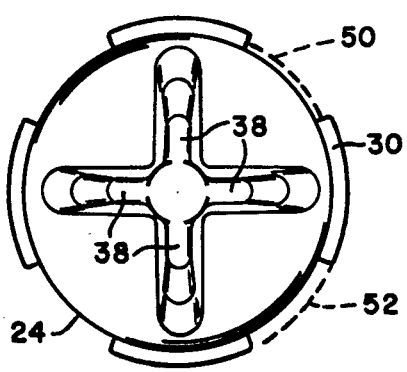
FIG. 4 is a left side view of FIG. 2.
Figure 3:
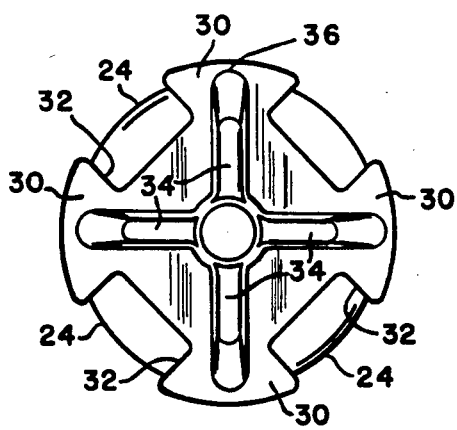
FIG. 3 is a right side view of FIG. 2.

The first resilient sleeve 20 extends from a relaxed end 46 opposite the tube 10 to an expanded end 48 sealingly engaging the tube 10. The first resilient sleeve 20 is further expanded radially to engage the ribs 38, the first surface 24, the second surface 28 and the ribs 34. With the first resilient sleeve 20 sealingly engaging the annular profile of first surface 24 and the tube 10, the interior of tube 10 is closed to trap fluid pressure therein. As the fluid pressure within the tube increases, the first resilient sleeve 20 is expanded slightly until a predetermined pressure level is reached, whereupon the resiliency of the first resilient sleeve is overcome by the fluid pressure to expand the first resilient sleeve in spaced relation to the first surface 24. At this time the first resilient sleeve 20 is spaced from the surface 24 as indicated in phantom at 50 in FIG. 4, but not fully expanded to a diameter corresponding to the outer dimension of second surface 28. A fluid passage is opened via the ribs 38, the cutouts 32 and the ribs 34 to communicate fluid pressure from the system 12 and the interior of the tube 10 to the atmosphere surrounding the end 46. A further increase in fluid pressure biases the portion of the first resilient sleeve overlapping the surface 24 to continue expanding to a position indicated in phantom at 52 in FIG. 4 so that the window 32 is fully opened to enlarge the fluid passage and increase fluid flow outwardly from the system 12 and the interior of the tube 10. A decrease in fluid pressure to a level below the predetermined pressure level causes the first resilient sleeve to contract and reestablish a sealing engagement with the first surface 24.

The second resilient sleeve 22 overlaps the first resilient sleeve 20 at the location of the tube 10 and the inner leading edge 42 in order to define a tight sealing interface between the tube 10 and the first resilient sleeve 20. In the alternative, it is feasible to eliminate the second resilient sleeve provided an adequate seal is established between the tube 10 and the first resilient sleeve 20.

The first resilient sleeve is expanded to fit over the body 16 and the tube 10. Consequently, these expanded positions determine the maximum pressure level and function much like a simple balloon that is hard to blow up from its original state, but when expanded it becomes easier to inflate as it grows in size. Therefore, the pressure relief valve herein is designed as a low pressure relief valve with the predetermined pressure for opening and closing the fluid passage set at about 180 mm Hg.

I claim:

1. A pressure relief valve cooperating with a tube which receives pressurized fluid, comprising a body coupled to an end of the tube, the body cooperating with the tube to define a fluid passage communicating with fluid pressure in the tube, a resilient sleeve engageable with the tube and the body to normally close the fluid passage, the resilient sleeve being responsive to fluid pressure above a predetermined level to open the fluid passage and permit fluid flow outwardly from the tube, the body defining a first surface cooperating with the resilient sleeve to initially open the fluid passage when the fluid pressure in the tube approaches the predetermined level, the body defining a second surface cooperating with the resilient sleeve to control further opening of the fluid passage in response to fluid pressure in the tube above the predetermined level, and the second surface defining a plurality of flanges defining a larger diameter than a diameter defined by the first surface.

2. A pressure relief valve cooperating with a tube which receives pressurized fluid, comprising a body coupled to an end of the tube, the body cooperating with the tube to define a fluid passage communicating with fluid pressure in the tube, a resilient sleeve engageable with the tube and the body to normally close the fluid passage, the resilient sleeve being responsive to fluid pressure above a predetermined level to open the fluid passage and permit fluid flow outwardly from the tube, the body defining a first surface cooperating with the resilient sleeve to initially open the fluid passage when the fluid pressure in the tube approaches the predetermined level, the body defining a second surface cooperating with the resilient sleeve to control further opening of the fluid passage in response to fluid pressure in the tube above the predetermined level, and the valve body defining a first plurality of ribs engageable with the resilient sleeve upstream from the first surface and a second plurality of ribs engageable with the resilient sleeve downstream from the second surface.

3. A pressure relief valve cooperating with a tube which receives pressurized fluid, comprising a body coupled to an end of the tube, the body cooperating with the tube to define a fluid passage communicating with fluid pressure in the tube, a resilient sleeve engagable with the tube and the body to normally close the fluid passage, the resilient sleeve being responsive to fluid pressure above a predetermined level to open the fluid passage and permit fluid flow outwardly from the tube, the body defining a first surface cooperating with the resilient sleeve to initially open the fluid passage when the fluid pressure in the tube approaches the predetermined level, the body defining a second surface cooperating with the resilient sleeve to control further opening of the fluid passage in response to fluid pressure in the tube above the predetermined level, the second surface defining a plurality of flanges which are spaced circumferentially apart to form windows adjacent the first surface, and the windows between successive flanges form an inner edge having a radial dimension smaller than the first surface.

4. A pressure relief valve cooperating with a tube which receives pressurized fluid, comprising a body coupled to an end of the tube, the body cooperating with the tube to define a fluid passage communicating with fluid pressure in the tube, a resilient sleeve engageable with the tube and the body to normally close the fluid passage, the resilient sleeve being responsive to fluid pressure above a predetermined level to open the fluid passage and permit fluid flow outwardly from the tube, the body defining a first surface cooperating with the resilient sleeve to initially open the fluid passage when the fluid pressure in the tube approaches the predetermined level and the body defining a second surface cooperating with the resilient sleeve to control further opening of the fluid passage in response to fluid pressure in the tube above the predetermined level, a first plurality of ribs extending from the second surface, and a second plurality of ribs extending from the second surface, the first plurality of ribs defining a uniform radial outer dimension and the second plurality of ribs defining a tapered outer dimension.

5. A pressure relief valve cooperating with a tube which receives pressurized fluid, comprising a body coupled to an end of the tube, the body cooperating with the tube to define a fluid passage communicating with fluid pressure in the tube, a resilient sleeve engageable with the tube and the body to normally close the fluid passage, the resilient sleeve being responsive to fluid pressure above a predetermined level to open the fluid passage and permit fluid flow outwardly from the tube, the body defining a first surface cooperating with the resilient sleeve to initially open the fluid passage when the fluid pressure in the tube approaches the predetermined level and the body defining a second surface cooperating with the resilient sleeve to control further opening of the fluid passage in response to fluid pressure in the tube above the predetermined level, and the second surface defining a plurality of flanges spaced from each other at a diameter larger than the first surface and each of the flanges including an axially extending rib extending away from the first surface.

6. The pressure relief valve of claim 5 in which each rib adjoins its respective flange at a radial location substantially equal to a radial outer dimension for the first surface.

7. A pressure relief valve cooperating with a tube which receives pressurized fluid, comprising a body coupled to an end of the tube, the body cooperating with the tube to define a fluid passage communicating with fluid pressure in the tube, a resilient sleeve engageable with the tube and the body to normally close the fluid passage, the resilient sleeve being responsive to fluid pressure above a predetermined level to open the fluid passage and permit fluid flow outwardly from the tube, the body defining a first surface cooperating with the resilient sleeve to initially open the fluid passage when the fluid pressure in the tube approaches the predetermined level and the body defining a second surface cooperating with the resilient sleeve to control further opening of the fluid passage in response to fluid pressure in the tube above the predetermined level, the resilient sleeve defining a relaxed diameter which is less than a diameter for the tube and the resilient sleeve is yieldably expanded to overlap the tube, the first surface and the second surface, and the first surface defining a diameter larger than the tube diameter and the second surface defining a diameter larger than the first surface diameter.

* * * * *